United States Patent [19]

Schwartz

[11] 4,007,993
[45] Feb. 15, 1977

[54] PIPE COUPLER

[76] Inventor: Edward J. Schwartz, 758 Perrien Place, Grosse Pointe Woods, Mich. 48236

[22] Filed: Apr. 4, 1975

[21] Appl. No.: 565,084

[52] U.S. Cl. .................. 403/3; 403/233; 403/191; 285/150

[51] Int. Cl.[2] .......................... F16B 7/00

[58] Field of Search ............ 403/3, 234, 237, 233, 403/191; 285/150, 156

[56] References Cited

UNITED STATES PATENTS

| 862,246 | 8/1907 | Gutelius | 403/237 |
|---|---|---|---|
| 878,867 | 2/1908 | Coldwell | 403/237 |
| 891,100 | 6/1908 | Rankin | 403/191 |
| 1,020,123 | 3/1912 | Brampton et al. | 285/156 |

FOREIGN PATENTS OR APPLICATIONS

| 103,066 | 1/1938 | Australia | 403/233 |
|---|---|---|---|
| 79,290 | 4/1919 | Switzerland | 403/237 |

*Primary Examiner*—Andrew V. Kundrat
*Attorney, Agent, or Firm*—Frank John Catalano

[57] ABSTRACT

A pipe coupler has a pair of gripping members with corresponding angularly displaced channels and planar webs. The gripping members are adapted to clasp the pipes between corresponding channels with the gripping members in a spaced apart relationship. Means are also provided for cooperation with the webs to draw the gripping members into closer spaced apart relationship so as to rigidly secure the pipes in the channels.

1 Claim, 7 Drawing Figures

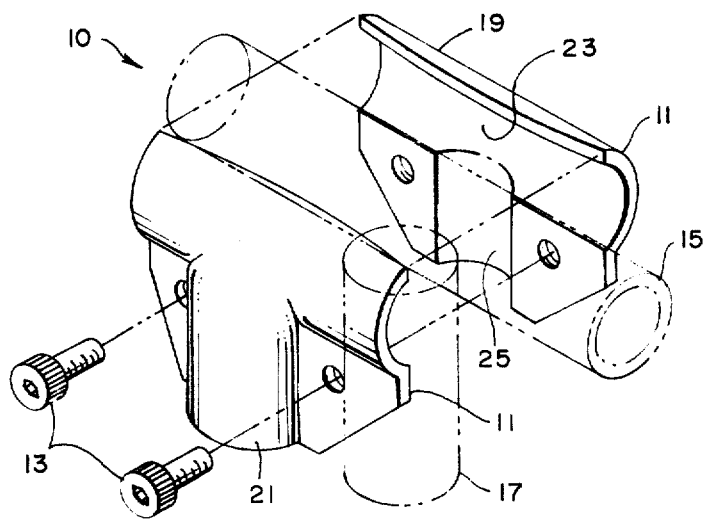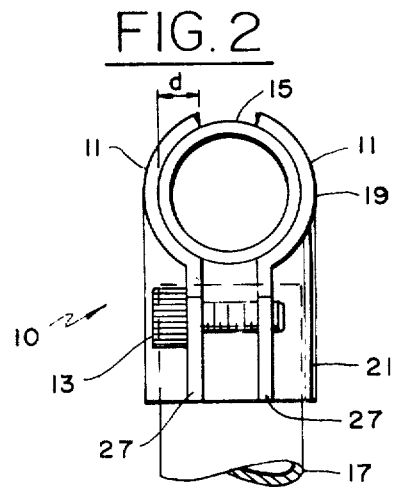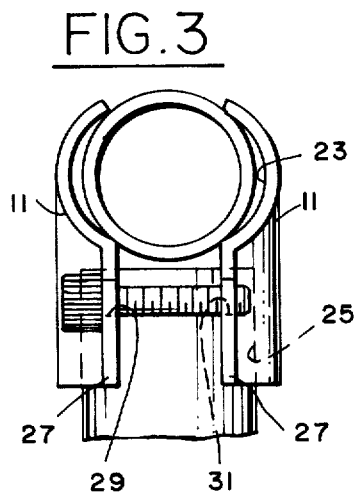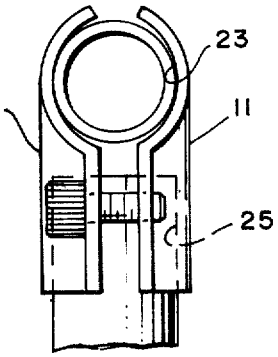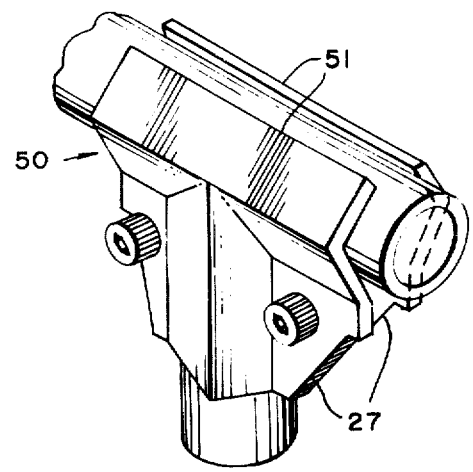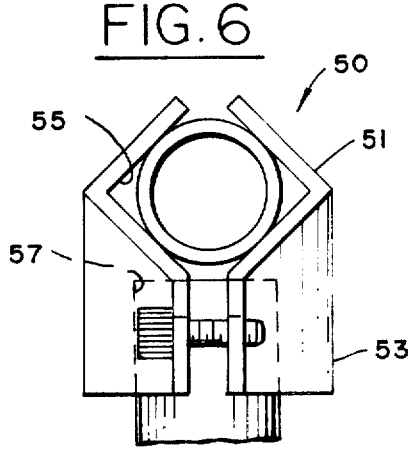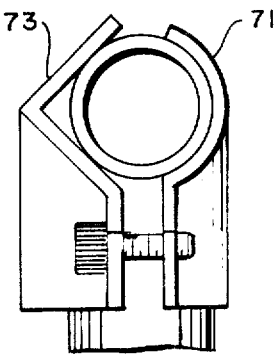

PIPE COUPLER

BACKGROUND OF INVENTION

This invention relates generally to fittings for structural members and more particularly to couplings for tubular members, such as pipes and the like.

Pipe couplers are commonly available in a range of sizes, each size of coupler being intended for use with a single size of pipe. Use of an inappropriate coupler size results in diminution or total loss of the gripping strength of the coupler.

Many couplers are so designed as to make disassembly of an existing tubular structure necessary in order to add to the structure.

Others require drilling, tapping, pinching or bending of the tubular members to provide a stable connection.

Therefore, it is among the objects of this invention to provide a pipe coupler of one size suitable to couple pipes of a range of sizes.

A further object of the invention is to provide a pipe coupler having high gripping strength.

Another object of the invention is to provide a pipe coupler which rigidly secures pipes in an angular relationship.

Yet another object of the invention is to provide a coupler usable to connect pipes to an existing framework without detachment of the existing framework.

It is also an object of the invention to provide a coupler usable to connect pipes without any necessity of drilling, tapping, pinching or bending of the pipes.

SUMMARY OF INVENTION

Accordingly, the invention contemplates a pair of gripping members, each of which has a plurality of angularly displaced channels with a plurality of planar webs disposed between them. A plurality of pipes disposed between the corresponding channels of the gripping members are connected with gripping members spaced apart. Means are also provided which cooperate with corresponding webs on each of the gripping members to draw the gripping members into closer spaced apart relationship. Thus the pipes are rigidly secured.

BRIEF DESCRIPTION OF THE DRAWINGS

Other objects and advantages of the invention will become apparent upon reading the following detailed description and upon reference to the drawings, in which:

FIG. 1 is a perspective view of one embodiment of the coupler;

FIG. 2 is an end view of the coupler of FIG. 1 used with pipes of intermediate diameter;

FIG. 3 is an end view of the coupler of FIG. 1 used with pipes of large diameter;

FIG. 4 is an end view of the coupler of FIG. 1 used with pipes of small diameter;

FIG. 5 is a perspective view of another embodiment of the coupler;

FIG. 6 is an end view of the coupler of FIG. 5, and

FIG. 7 is an end view of a combination of the couplers of FIGS. 1 and 5.

DETAILED DESCRIPTION OF THE INVENTION

Turning first to FIGS. 1 and 2, one embodiment of a pipe coupler 10, preferably stamped from sheet metal, is illustrated.

The coupler 10 consists of a pair of gripping members 11 which, when mated by use of a suitable securing means as screws 13, clasp the pipes 15 and 17 therebetween.

Each gripping member 11 has a plurality of channels 19 and 21 angularly disposed in accordance with the desired angular disposition of the pipes 15 and 17. As shown, if a T arrangement of pipes 15 and 17 is desired, the channels 19 and 21 are at right angles to each other.

In order to accomplish the object of having a single coupler which will be usable for coupling pipes having a range of sizes, the depth $d$ of the channels 19 and 21 is less than one half of the diameter of the smallest pipe included in the range. For example, for pipes varying from ½ inch to 1 inch outer diameter, the depth $d$ of the channel 21 would be less than ¼ inch. The inner walls 23 and 25 of the channels 19 and 21 are, in cross-section, circular arcs, the radii of the arcs being approximately equal to the average outer radii of the pipes included in the range.

Consequently, when the coupler 10 is used for coupling pipes having an outer radius equal to the coupler arc radius, the gripping force will be relatively evenly distributed along the inner walls 23 and 25 as shown in FIG. 2. For pipes having greater or lesser outer radii, the gripping force will be concentrated on portions of the inner walls, as is illustrated in FIGS. 3 and 4 respectively.

To facilitate mating of the gripping members 11 and to provide added rigidity and stability to the pipe connection, each gripping member 11 is provided with a plurality of planar webs 27 disposed between the channels 19 and 21.

In the mated condition these webs 27 lie in face to face apart relationship. Means adapted to engage with the webs 27 and to draw them into closer face to face relationship secures the pipes between the gripping members 11.

As shown, the preferred securing means consists of screws 13 extending through smooth apertures 29 in the webs 27 of one of the gripping members 11 and into threaded apertures 31 in the webs 27 of the other gripping member 11. Other means, as for example a nut and bolt arrangement, could also be used.

In assembling a pipe structure, the pipes are placed in their desired angular disposition. The gripping members 11 are applied to opposite sides of the junction with the pipes resting in the appropriate channels. The screws are then tightened, drawing the gripping members together and rigidly securing the pipes in place.

It should be noted that the above description would also apply to other angular configurations, as for example X or Y connections.

Turning now to FIGS. 5 and 6, another embodiment of the pipe coupler 50 is illustrated. This embodiment is substantially similar to that already described, except that the channels 51 and 53 have two planar inner walls 55 and 57 rather than arced inner walls. As a result, the gripping force will be concentrated on portions of the inner walls 55 and 57 regardless of the radius of the pipe.

As is shown in FIG. 7, it is also possible to combine an arcuate gripping member 71 and a planar gripping member 73 to achieve yet another concentration of gripping forces.

Thus it is apparent that there has been provided, in accordance with the invention, a pipe coupler that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A pipe coupler comprising a pair of gripping members, each of said gripping members having a plurality of angularly displaced channels and a plurality of planar webs disposed between said channels, said channels of one of said gripping members having an arcuate cross-section and said channels of the other of said gripping members having a V-shaped cross-section, said gripping members being adapted to be mated together in spaced apart relationship to connect a plurality of pipes between corresponding ones of said channels, and means cooperable with corresponding ones of said webs for drawing said gripping members into closer spaced apart relationship, whereby the pipes are rigidly secured between said gripping members.

* * * * *